(12) United States Patent
Swift et al.

(10) Patent No.: US 7,215,357 B1
(45) Date of Patent: May 8, 2007

(54) LINE BLANKER SYSTEM

(75) Inventors: David C. Swift, Cortlandt, NY (US); Gerard M. Lazzaro, New Milford, CT (US); Gregory J. Hamlin, Presque Island, ME (US); Sadeg M. Faris, Pleasantville, NY (US)

(73) Assignee: Vrex, Inc., Elmsford, NY (US)

( * ) Notice: Subject to any disclaimer, the term of this patent is extended or adjusted under 35 U.S.C. 154(b) by 0 days.

(21) Appl. No.: 09/296,990

(22) Filed: Apr. 22, 1999

Related U.S. Application Data

(63) Continuation-in-part of application No. 09/164,050, filed on Sep. 30, 1998.

(60) Provisional application No. 60/083,360, filed on Apr. 28, 1998.

(51) Int. Cl.
 H04N 9/47 (2006.01)
 G02B 27/22 (2006.01)

(52) U.S. Cl. .......................... 348/56; 359/464

(58) Field of Classification Search ............. 348/42, 348/51, 53, 55, 56, 57, 58, 59, 43, 46; 359/464; 345/419, 420, 421, 433, 435
See application file for complete search history.

(56) References Cited

U.S. PATENT DOCUMENTS 4,399,456 A * 8/1983 Zalm ........................ 348/43
5,786,848 A * 7/1998 Isobe et al. ................ 348/51
6,088,052 A * 7/2000 Guralnick .................. 348/51
6,295,065 B1 * 9/2001 Tettington ................. 345/419

OTHER PUBLICATIONS http://www.i-glasses.com/html/3d_hardware.php3, no date.
http://www.anotherworld.to/eng/index.htm, no date.
http://www.iart3d.com/iart/iarte/home/home.htm Sep. 3, 1999.
http://www.vrstandard.com/products/prod_vrjoy.htm Sep. 10, 1998.
http://www.tetratel.com/products/products.htm Sep. 21, 1999.

* cited by examiner

*Primary Examiner*—Gims Philippe

(57) ABSTRACT

A line blanker system for converting a stereoscopic image into a line-blanked stereoscopic image suitable for stereoscopic viewing on a standard non-interleaved display device is provided. The system includes a method for controlling the line blanker. According to the invention, one can enable and disable the line blanker, identify the first line of the image being processed and determine whether the first line is for viewing by the left eye or the right eye of a viewer. In addition, the invention includes a line doubler. The line doubler provides enhanced brightness and resolution by replacing the blanked line with a double of the line immediately adjacent to the blanked line.

21 Claims, 6 Drawing Sheets

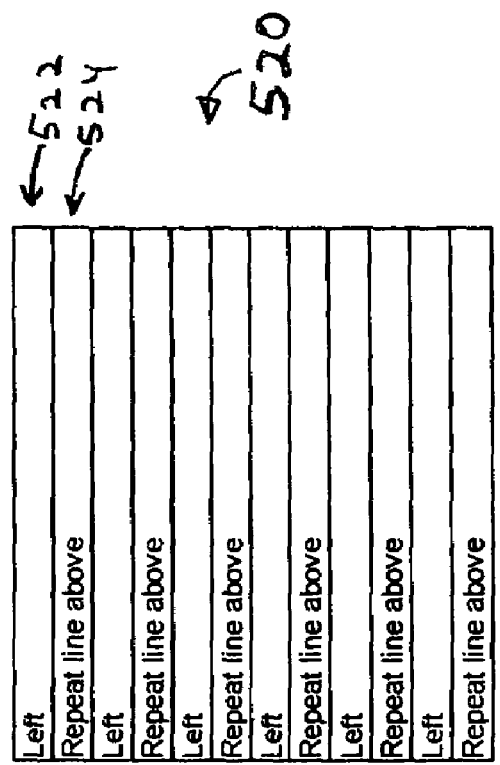
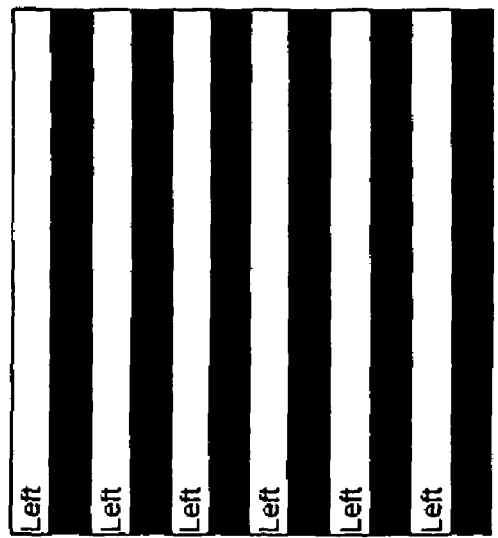
FIG. 5

LINE BLANKER SYSTEM

CROSS-REFERENCE TO RELATED APPLICATIONS

This is a continuation-in-part of U.S. patent co-pending commonly-assigned U.S. patent application Ser. No. 09/164,050, filed Sep. 30, 1998 which is hereby incorporated by reference in its entirety, and claims priority from U.S. Provisional Patent Application No. 60/083,360, filed Apr. 28, 1998.

BACKGROUND OF THE INVENTION

The application relates to systems for viewing stereoscopic 3-D images. More specifically, this application relates to a system for providing stereoscopic 3-D vision with full 3-D depth sensation.

To further understand the invention, a short introduction concerning 2-D video displays follows. Diverse types of image display devices have been developed for displaying 2-D images. Examples of such technologies include: cathode ray tube (CRT) display monitors; liquid crystal display panels; plasma display panels; active-matrix plasma display panels, etc. Presently, the CRT display device (i.e., CRT tube) is widely used in most video monitors of personal computer (PC) systems, as well as in most commercially produced television sets. The principle difference between a CRT computer video monitor and a CRT television display tube is the rate at which image frames or lines are displayed, and the composition of the video signals which each such display device is designed to receive and display during the image display process. In conventional CRT-based television sets, which are constructed and operate according to NTSC or PAL design criteria, the horizontal and vertical synchronization (or retrace) signals are multiplexed with the RGB (i.e., color) signals to produce a single composite video signal that is transmitted over a signal conductor.

In conventional CRT-based computer display monitors, which are constructed and operated according to VGA or SVGA design criteria, the horizontal synchronization signal, and the RGB (i.e., color) signals are each transmitted separately over individual signal conductors and require a six (6) pin electrical connector for VGA and SVGA styled video monitors.

These design standards create different electrical interface requirements for such types of CRT display devices. NTSC and PAL video signals can only be driven by NTSC and PAL signals, respectively, whereas VGA and SVGA styled video display monitor devices can only be driven by VGA and SVGA video signals, respectively. Therefore, VGA or SVGA video signals generated from a graphics accelerator/video board within a computer graphics workstation cannot be used to produce video graphics on a CRT-based television set without the use of special signal conversion equipment. Similarly, NTSC or PAL video signals generated from a television set or VCR player cannot be used to produce video graphics on a CRT-based computer video monitor without the use of similar special signal conversion computer.

While there exist several different techniques for achieving stereoscopic 3-D viewing with depth sensation, the "field-sequential" or "time-multiplexing" technique enjoys great popularity. The field-sequential technique sequentially presents to the left eye of a viewer the left image of a stereoscopic image pair displayed on a video display screen during a left image display period, and thereafter, presents to the right eye of the viewer the right image of the stereo pair displayed during a right image display period.

In one known implementation, the field-sequential system uses LCD shutter glasses to control the image presented to the viewer. More specifically, the function of the LCD shutters is to sequentially change optical state during the left and right image display periods, in order to allow the viewer to sequentially undergo a change in his viewing from left eye to right eye and vice versa. This allows the viewer to view displayed stereo pairs in a manner which produces simulated 3-D viewing. Simulated 3-D viewing is produced because the left and right images are fused in the mind of the viewer into one image.

The function of the shutters is implemented by electrically switching the optical state of the LCD shutters in response to trigger signals. In particular, at the beginning of the left image display period, the optical state of the left eye LCD shutter is synchronously switched from its opaque state to its transparent state and the optical state of the right eye LCD shutter is synchronously switched from its transparent state to its opaque state. At the beginning of the right image display period, the optical state of the right eye LCD shutter is synchronously changed from its opaque state to its transparent state and the optical state of the left eye LCD shutter is synchronously changed from its transparent state to its opaque state.

Two specific platforms upon which the time-sequential technique can be provided are platforms providing interlaced (or interleaved) images and platforms providing page-flipped non-interleaved (or progressive) images.

The interlacing method uses the interlaced mode of the display device, wherein the odd lines of an image buffer are displayed in one vertical sweep (which corresponds to a complete screen image) of the cathode ray or other suitable image producer, while the even lines of the image buffer are displayed during the next vertical sweep. In the interlaced mode, the two image streams are interleaved by placing one image stream on the odd lines of the buffer, and one image stream on the even lines, which produces a single interleaved image stream. The interleaved image stream is then converted to a time multiplexed pair of image streams by the interlacing hardware of the display device. This produces an image which, with the aid of synchronized shutter glasses, appears to the viewer in 3-D.

In the page-flipped mode, the time-multiplexing involves alternately displaying images from two image streams. This is accomplished by either copying them one after another into a single image buffer, or by copying them into two separate image buffers and then rapidly switching the display device between the two buffers.

Presently, a number of line blanker systems which utilize specialized display devices are available for use with the field-sequential stereoscopic 3-D image display technique. While some systems are designed for use with CRT display devices driven by VGA video signals (which have an interlaced and a non-interlaced mode), others are designed for use with CRT display devices driven by composite video sources (which have only an interlaced mode).

One drawback of conventional line blanker systems involves an inability to identify the first line of video in a video image. An undetermined first line can cause some video resolutions to be displayed in pseudostereoscopic format (that is, the right and left images are displayed to the wrong eyes because the line-blanking is out of phase with the shutter glasses).

Another drawback of conventional line blanker systems is the inability to enable or disable the blanking feature. It may be desirable to turn off the line blanking when 2-D images and text information are to be viewed on the display.

Another drawback of conventional line blanker systems is that line blanking is typically accomplished by replacing video lines with "black" (or non-viewable) information. This method cuts the resolution and brightness of the line-blanked image by a factor of two.

Therefore, it would be desirable to provide a line blanker system that can identify the first line of a video image.

It would also be desirable to provide a line blanker system that is capable of enabling and disabling the line blanking feature.

It would also be desirable to provide a line blanker system that allows a video image to be viewed with full resolution and brightness.

SUMMARY OF THE INVENTION

It is an object of this invention to provide a line blanker system that can identify the first line of a video image.

It is another object of this invention to provide a line blanker system that is capable of enabling and disabling the line blanker feature.

It is another object of this invention to provide a line blanker system that allows a video image to viewed with full resolution and brightness.

A method for controlling a line blanker is provided. The line blanker alternately blanks even and odd lines of a stereoscopic image to allow the image to be viewed stereoscopically on a standard display system. The method comprises providing a stereoscopic image, converting the stereoscopic image to a line-blanked stereoscopic image and providing a control signal in the image to control the operations of the line blanker.

A line blanker that converts a stereoscopic image into a line-blanked stereoscopic image is also provided. The line-blanked image can be viewed on a standard non-interleaved display device by a viewer wearing shutter glasses. The shutter glasses are constructed such that a viewer can see out of either his left eye or his right eye, or both.

The line blanker comprises a line buffer or interpolator that alternately blanks even or odd lines of the stereoscopic image. A line doubler or black video generator may also be included to fill the blanked lines with either a doubled line from the adjacent non-blanked line, or a line of black video. An image fabrication unit is also included that assembles the 3-D image. A line processor receives both the stereoscopic image and the line-blanked stereoscopic image and is instructed by a control unit to selectively output one of the images.

BRIEF DESCRIPTION OF THE DRAWINGS

The above and other aspects of the invention will become apparent upon further consideration of the following detailed description, taken in conjunction with the accompanying drawings, in which like references refer to like characters throughout, and in which;

FIG. 5 is a schematic diagram of the lines of a video image; and

DETAILED DESCRIPTION OF THE INVENTION

In the aforementioned copending commonly-assigned application Ser. No. 09/164,050, a system which alternately blanks even and odd lines of a 3-D progressive stereoscopic image to simulate a page-flipping stereoscopic viewing system is described in detail. The system, called a line blanker, provides a device located in-line between an image generation device and a standard display device. This allows any stereoscopic image to be viewed time-sequentially on substantially any standard progressive display system.

In order to be processed by the line blanker, the 3-D image must be formatted in a line-alternate mode. That is, each line of video alternates between right and left images. The line blanker then blanks out the lines of the left or right image, whichever one is not being viewed at the time. A further benefit is derived from being an in-line device because the line blanker preferably does not require any additional control signals other than those associated with the actual video signal and a source of power.

Several improvements have been made to the line blanker system. First, the system has been improved to provide line-blanking for any progressive display system in any resolution format, i.e., substantially any type of flat panel displays or LCD projection systems. This feature is enabled because the line blanker is located in-line between the image generator and the display device. Therefore, every video image is transmitted through the line blanker, which can then blank the required lines, independent of the type of interleaved video system.

Also, the system now provides a technique for identifying the first line of a video signal and eliminating any pseudostereoscopic flipping, the phenomenon in which right and left images are viewed by the wrong eyes, has been developed. This technique is based on providing a signal in the first line of each individual image. This signal is received by the line blanker and used as a reference, as will be described below.

In addition, the system provides a technique to turn on and off the line blanking system. This technique also involves sending a signal embedded in the video transmission. In this case, however, the signal instructs the line blanker to either enable or disable the blanking feature.

Finally, a technique has been developed to improve the resolution and brightness in a time-sequential device. This technique is preferably accomplished by storing each line of the image presently being displayed in an image buffer, and reproducing each line of the displayed image in the adjacent line of video. This restores the resolution and brightness because each line that was previously black has been replaced by a line of the image, even though the replaced line is only a "double" of the line next to it.

Figure 1:
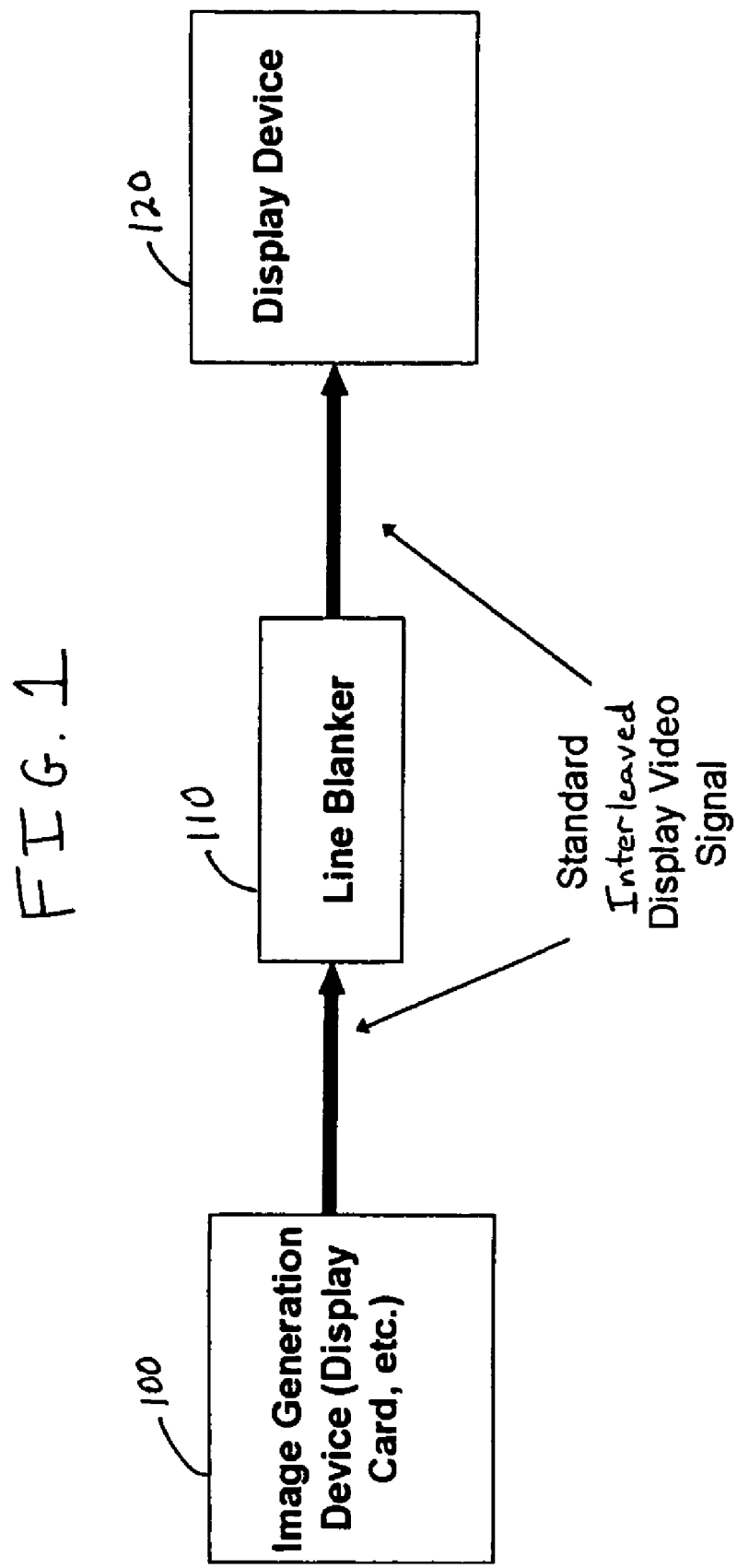
FIG. 1 is a block diagram of a video system according to the invention.

FIG. 1 shows a preferred arrangement of an image generation device 100, a line blanker 110 and a display device 120. Because the in-line hardware implemented line blanker 110 is positioned between image generation device 100 and display device 120 to alternately blank odd and even lines of the stereoscopic image, all video images pass through line blanker 110. Therefore, it is possible to apply the techniques to other types of progressive displays like liquid crystal display (LCD) systems, computer platform display systems, next generation digital display systems, etc. Though the aforementioned copending commonly-assigned application Ser. No. 09/164,050 focused on red, green, blue video systems, the line blanker can be easily applied to any video format like SECAM, YUV, S-Video, digital formats, LCD pixel matrix systems, etc. In fact, any video system where an in-line processor can replace a line of video with a black line can be converted to a page-flipped 3-D stereoscopic display using the previously disclosed line blanker. Using line blanker 110 in a strictly in-line mode also preferably eliminates additional control signals and allows for the widest deployment for all progressive formats.

Figure 2:
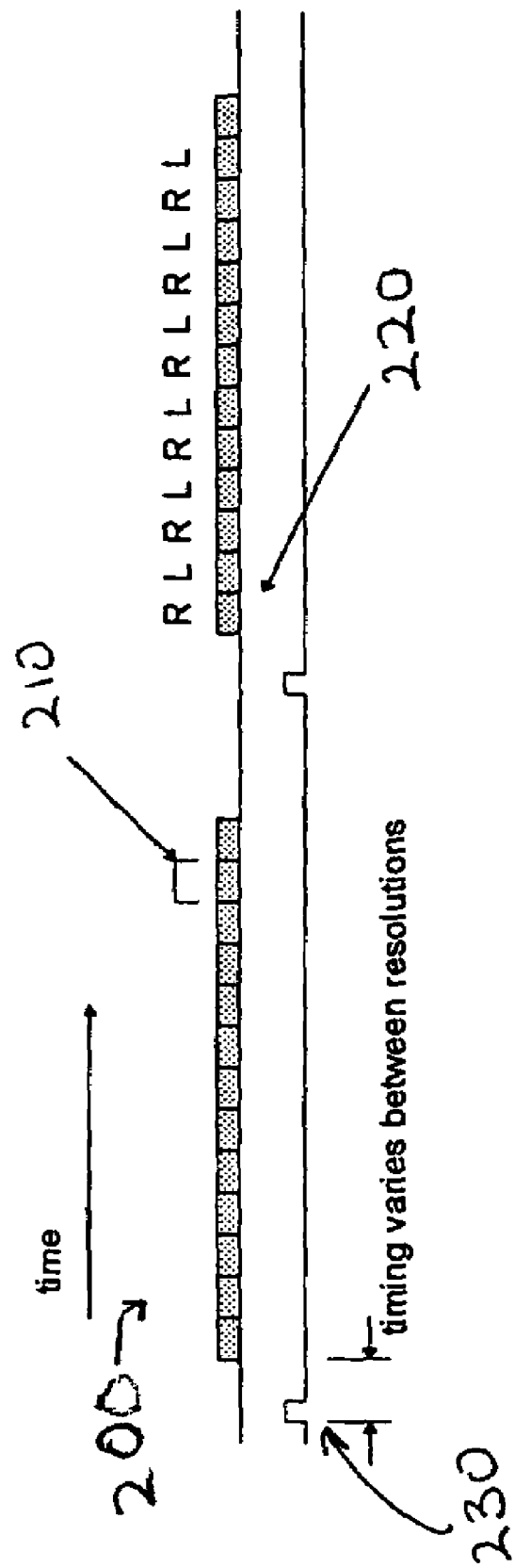
FIG. 2 is a schematic diagram of exemplary video signals.

FIG. 2 shows a video signal 200 comprising individual horizontal lines of video 210 (which represent horizontal sweeps of the cathode ray). The vertical retrace signal 230 indicates the beginning of a new image. As indicated in FIG. 2, the length of horizontal lines of video 210 determine the resolution of image. On selected display systems, there is no guaranteed relationship between the first line of video 220, the number of horizontal lines, and the position of the vertical signal 230. This causes some video resolutions to be displayed in pseudostereoscopic format (that is, the right and left images will be displayed to the wrong eyes). One way of correcting for this phenomenon is by identifying the first line of video 220 and transmitting that information to the line blanker 110 and the shutter glasses. Once the relationship between the first line 220, the horizontal lines 210, and the vertical signal 230 is known, line blanker 110 can produce synchronized progressive 3-D stereoscopic images which are synchronized with the shutter glasses and not in pseudostereo mode.

One preferable way of accomplishing this is by inserting a special signal on the first line of video 220 called a first line signal (FLS). This signal can be detected by line blanker 110 and serve as a reference. Since the FLS is embedded in the actual video signal 200, no additional control lines to line blanker 110 are needed. This signal can also be used to send additional information to the line blanker system. In addition, by standardizing which eye is to view the first line 220 (right or left) of any given stereo image, pseudostereo mode can be eliminated.

In one preferred embodiment, line blanker 110 starts an even/odd counter when a vertical retrace signal 230 is encountered. This counter toggles between two states. Each new horizontal line 210 of video information toggles the counter. Once the FLS is encountered, the state of the even/odd counter can be latched for reference. For example, if the first line of video 220 is standardized for right eye viewing, as shown in FIG. 2, and the even/odd counter is odd when the FLS is detected, then the right image is shown and the right eye shutter should be opened on odd counts. On even counts, the left eye image is shown and left shutter is opened (further details concerning driving shutter glasses with a line blanker are available in the aforementioned copending commonly-assigned application Ser. No. 09/164,050).

In the alternative, one may implement this technique using other counting and toggling schemes. However, each technique preferably uses the position of the FLS as a reference. An even/odd counter of the type required here is well known in the art, and may be implemented using typical analog or digital circuitry.

Other alternative implementations of the FLS are described below in combination with the additional improvements to the line blanker system.

Another aspect of the present invention involves enabling and disabling the line blanking feature of the line blanker. Though the line blanker in the aforementioned copending commonly-assigned application Ser. No. 09/164,050 works well, it is unable to enable or disable the blanking feature while still processing video signals. However, it may be desirable to turn off the line blanking when 2-D images and text information are to be viewed on the display. One method of accomplishing is by encoding an on/off or enable/disable signal into the video. In a preferred embodiment, the same signal used to identify the first line of video can also be used to enable/disable the device.

Figure 3:
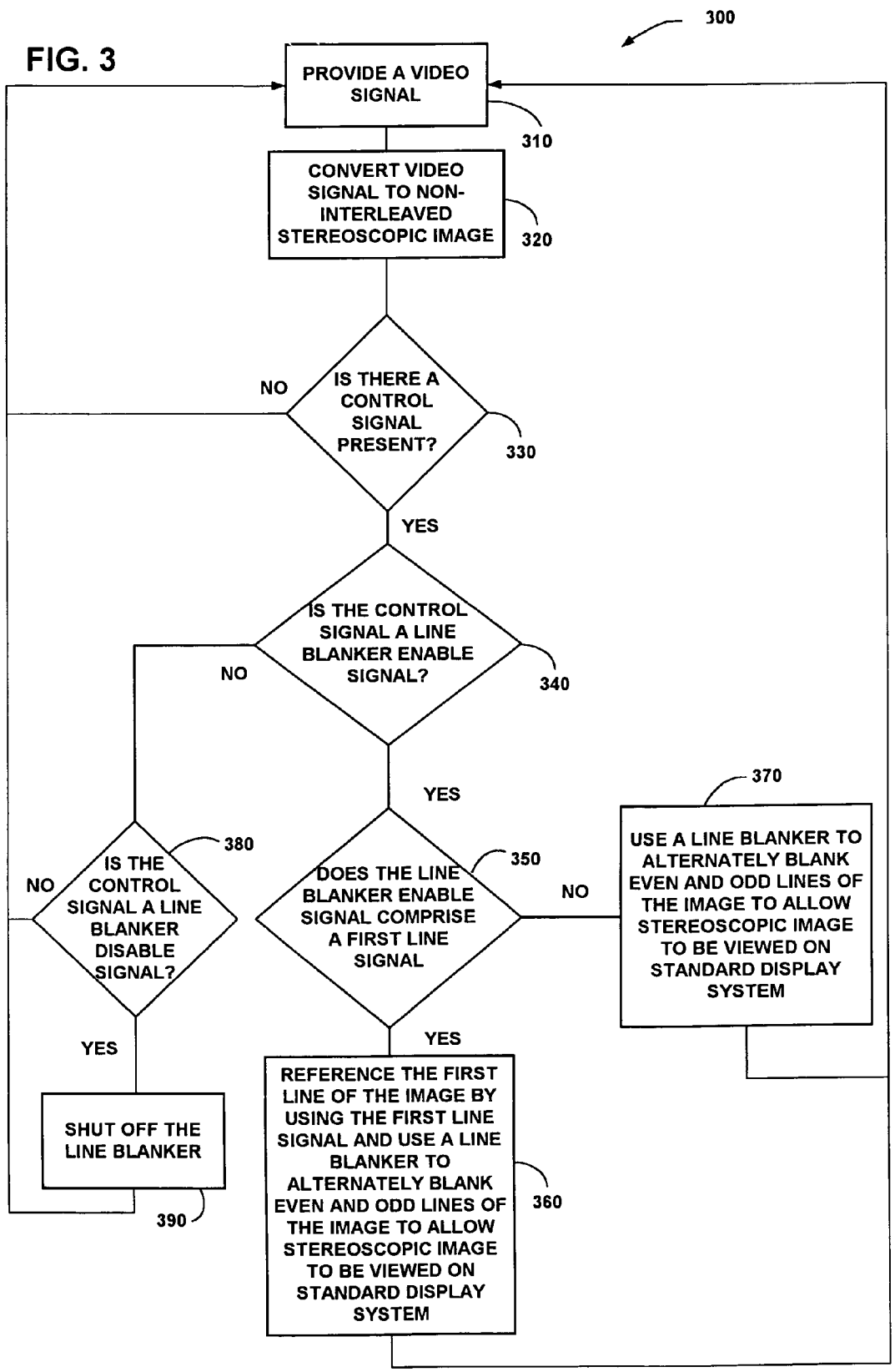
FIG. 3 is a flow chart of a line blanker system according to the present invention.

FIG. 3 is a flow chart 300 illustrating a preferable method of providing an enable/disable signal. The first step is to provide a video signal 310. This signal is then converted, if desired, into a stereoscopic image suitable for stereoscopic viewing on a progressive stereoscopic system, as shown in box 320. At this point, the image is transmitted to the line blanker which inquires if there is a control signal present in the image, as shown in box 330. If there is no signal present, the line blanker continues whatever action it had been doing and continues to process video signals.

If there is a control signal present, the line blanker analyzes the control signal to determine whether it is an enable signal for the line blanker or a disable signal for the line blanker, as shown in box 340.

If the line blanker signal comprises an enable signal, the line blanker may further determine whether the enable signal also comprises a first line signal, as shown in box 350. If the enable signal comprises a first line signal as well as an enable signal, the line blanker is activated and the first line signal is used as a reference, as shown in box 360. If the enable signal does not comprise a first line signal, the line blanker is activated without a reference, as shown in box 370.

If the line blanker signal is not an enable signal, the line blanker queries whether the line blanker signal is a disable signal, as shown in box 380. If it is a disable signal, the line blanker stops blanking, as shown in box 390.

Figure 4:
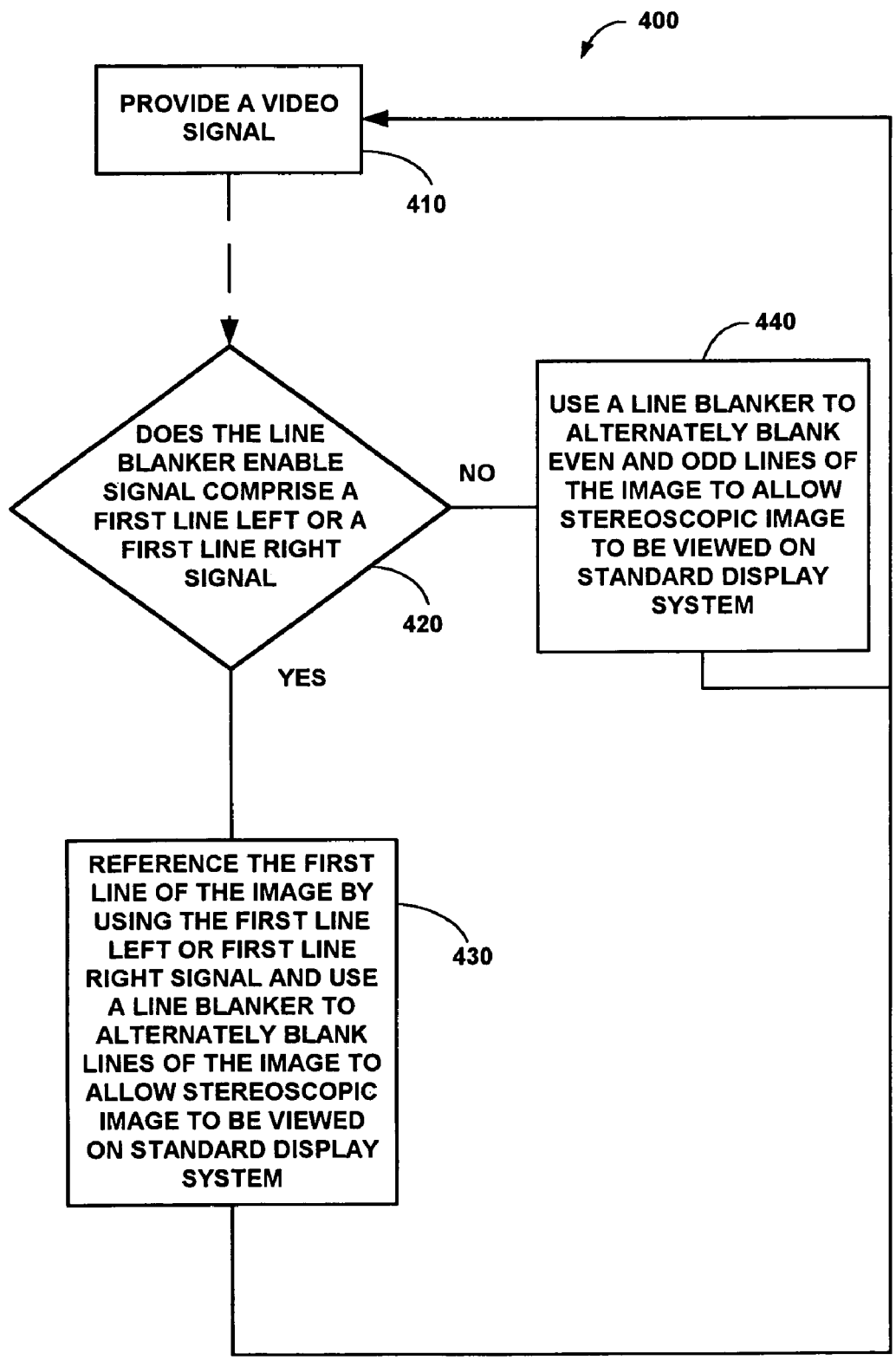
FIG. 4 is a flow chart of a line blanker system according to the present invention.

FIG. 4 is a flow chart 400 illustrating an alternate embodiment of a method for providing an enable/disable signal. In FIG. 4, the line blanker checks whether the enable signal comprises a first line left signal or a first line right signal, as shown in box 420. This replaces box 350 shown in FIG. 3, where the query was whether there was a first line signal as all. After a first line left or first line right signal is indicated, the line blanker uses the signal as a reference to commence line blanking with either the left or right image, as determined by the signal, as shown in box 430. If no first signal is encountered, the line blanker commences blanking without a reference, as shown in box 440.

Concerning implementation of the FLS signal or the enable/disable signals, it is possible to encode signals into the video data using several techniques. One way of encoding these signals is to encode a specific pattern of colors or images into the video data stream which can be detected by the line blanker system and are sufficiently unique that accidental signals do not occur in normal video images.

The most straightforward method is to encode a color pattern at the start of a single video line. Preferably, specific color patterns of the primary colors are used because they are easy to create and detect. Different color patterns can be used to signal different commands to the line blanker. A series of 256 patterns will fit into most video resolution formats and can be created to be sufficiently unique so as to not occur naturally in the video data stream.

One possible implementation, for example, would be to convert the color pattern into its red, green, and blue components. The blue signal could be used as a clock signal to gate the red and green signals into two separate binary shift registers. If a predefined relationship between the two shift registers is achieved, an option in the line blanker is triggered. Another possible embodiment is to create distinct color patterns for each line blanker option and use a programmed memory to store these codes for comparison to the incoming video information.

Only three signals are preferably needed to implement the novel functions for the line blanker. The signals are listed in Table 1.

TABLE 1

Line Blanker Signals

| Signal | Description |
|---|---|
| Disable | Turns off the line blanker operation. This disables the line blanking feature. |
| Enable (Left on First Line) | Turns on line blanking and indicates that the first line of viewable video is for the left eye. |
| Enable (Right on First Line) | Turns on the system and indicates that the first line of viewable video is for the right eye. |

In one preferred embodiment, implementation of multiple signals in the video reduces the effect of noise in the video line.

Another aspect of the present invention relates to improving the brightness and resolution of the image. As disclosed by the aforementioned copending commonly-assigned application Ser. No. 09/164,050, the line blanker simulates page flipping by replacing video lines with "black" (or non-viewable) information. This reduces the overall resolution and brightness by a factor of two.

To restore lost brightness and perceived resolution, a line doubler can be used. FIG. 5 shows the effect of a line doubler as compared to the conventional line blanker image. Screen 510 is from a previous line blanker system. Each odd line, e.g., line 512, shows a portion of the left image. Each even line, e.g. line 514, shows a blacked out line. Screen 520 is from a line blanker system according to the present invention. Each odd line, e.g., line 522, shows a portion of the left image. Each even line, e.g. line 524, repeats the line immediately above. This restores lost brightness and perceived resolution without sacrificing the quality of the 3-D reproduction.

One manner in which to implement a line doubler feature in the line blanker is as follows. As each line of video is fed through the line blanker, it may preferably be stored in a one-line frame buffer. When a line needs to be blanked out, instead of outputting a black signal, the previous line can be output again from the one-line frame buffer. In another embodiment, it is possible to apply standard line and frame interpolation techniques to the line blanker system to produce a smoother line doubling effect.

Figure 6:
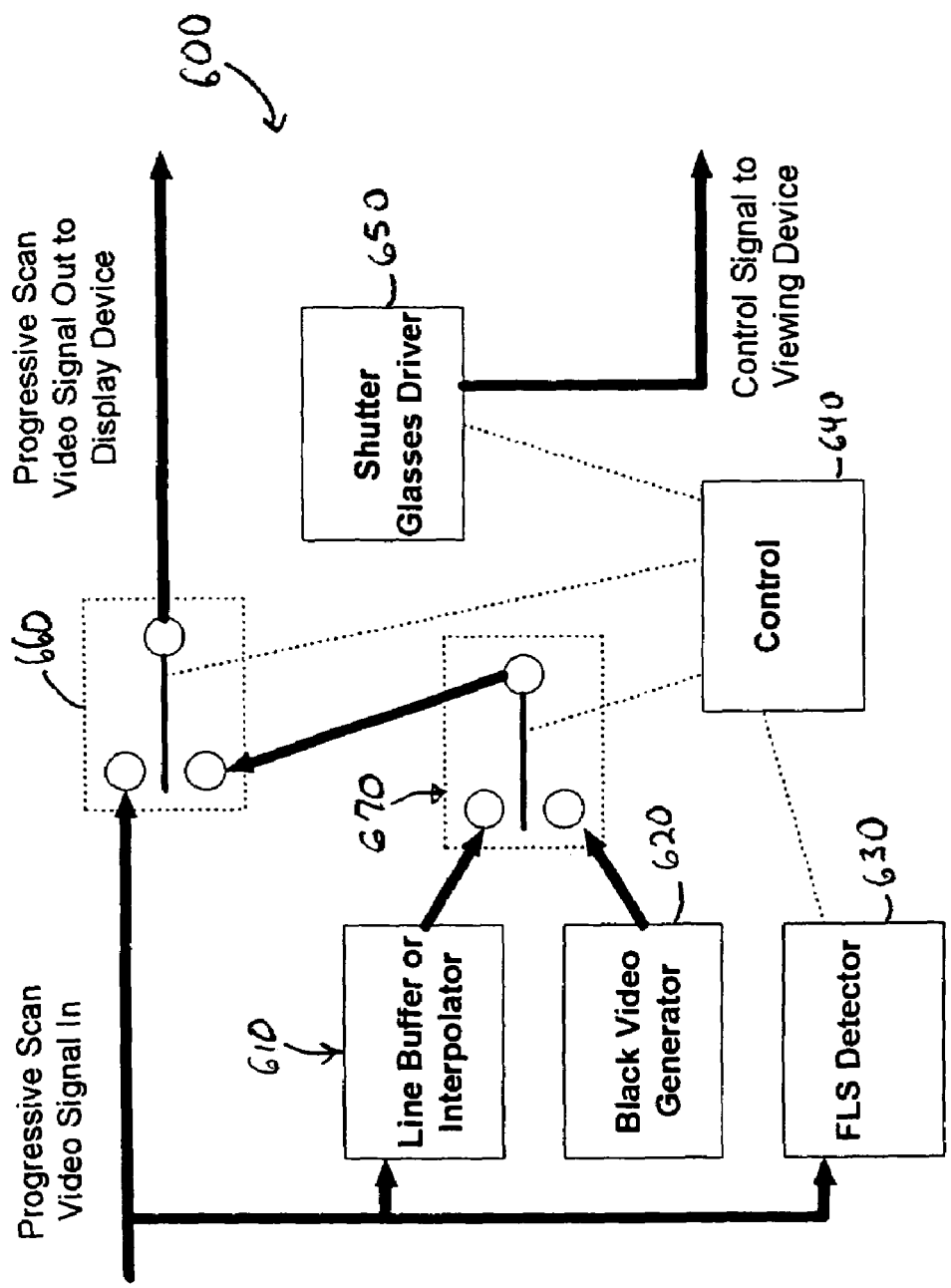
FIG. 6 is a block diagram of a line blanker system according to the present invention.

FIG. 6 shows a block diagram of a preferred embodiment of the improved line blanker system 600. The video signal is directed to the line processor 660, the line buffer or interpolator 610, and the FLS Detector 630.

First, if no line blanking is required, i.e., for a 2-D image, then the signal passes through line processor 660 to the display device. When, however, line blanking is required, the line buffer or interpolator 610 blanks alternate lines. The line buffer then feeds the image into the image fabrication unit 670. If required by the image, the black video generator 620 then contributes black lines to fill the blanks left by line buffer or interpolator 610. In the alternative, a line doubler can be implemented, as described above. These functions may preferably be controlled by control unit 640. At this point, the image is fed back to the line processor 660 for transmission to the display device.

When an FLS signal has been detected, FLS detector 630 communicates this to control unit 640 which informs image fabrication unit 670 and shutter glasses driver 650. When a first line left or first line right signal is indicated, the shutter glasses driver 650 may preferably set the shutter glasses to run synchronously with the image as it is displayed, thereby eliminating pseudostereoscopic mode.

Control unit 640 may also preferably be used to monitor incoming video for enable or disable signals.

Thus it is seen that a line blanker system has been provided. This system functions on substantially any progressive video system, improves resolution and brightness in 3-D images, provides for enabling and disabling the line blanking feature and identifies the first line of a video image. One skilled in the art will appreciate that the present invention can be practiced by other than the described embodiments, which are presented for purposes of illustration rather than of limitation, and the present invention is limited only by the claims which follow.

What is claimed is:

1. A method for controlling a line blanker, said line blanker being for converting a stereoscopic image into a line-blanked stereoscopic image by alternately blanking even and odd lines of said stereoscopic image, whereby said line-blanked image can be viewed on a standard non-interleaved display device by a viewer wearing shutter glasses having a left eye viewing portion and a right eye viewing portion, said method comprising:
   providing a stereoscopic image;
   converting said stereoscopic image to said line-blanked image; and
   providing a line blanker control signal embedded in said stereoscopic image, said line blanker being responsive to said control signal to enable or disable said line blanker,
   wherein said control signal is embedded within a first line signal of said line-blanked image.

2. The method of claim 1, wherein said providing a control signal comprises providing a first line signal being for determining which line is the first line of said line-blanked image.

3. The method of claim 2, wherein said providing a first line signal further comprises providing a toggle signal, whereby said counter substantially continuously indicates a counter position relative to a first line of said line-blanked image.

4. The method of claim 1, wherein said providing a control signal comprises providing a line blanker enable signal, said enable signal being for turning on said line blanker.

5. The method of claim 1, wherein said providing a control signal comprises providing a line blanker disable signal, said disable signal being for turning off said line blanker.

6. The method of claim 1, wherein said providing a line blanker control signal embedded in said stereoscopic signal comprises providing coded colors in said stereoscopic signal.

7. The method of claim 1, wherein said providing a control signal comprises providing a first line left signal, said first line left signal being for determining which line is a first line of said line blanked image and for indicating that the first line is for viewing by the left eye.

8. The method of claim 1, wherein said providing a control signal comprises providing a first line right signal, said first line right signal being for determining which line is a first line of said line-blanked image and for indicating that the first line is for viewing by the right eye.

9. The method of claim 1, wherein said providing a control signal comprises providing a first line control signal being for turning on said line blanker, turning off said line blanker and determining which line is the first line of said line-blanked image.

10. The method of claim 1, wherein said providing a control signal comprises providing a line double signal, said line double signal being for instructing said line blanker to select each one of 1) said even lines or 2) said odd line, store said selected line and place each stored line in a blanked line adjacent to said selected line for viewing by a viewer.

11. The method of claim 1, further comprising selecting each one of 1) said even lines or 2) said odd lines, storing said selected line and placing said stored line in a blanked line adjacent to said selected line for viewing by a viewer.

12. A line blanker that converts a stereoscopic image into a line-blanked stereoscopic image, whereby said line-blanked image can be viewed on a standard non-interleaved display device by a viewer wearing shutter glasses having a left eye viewing portion and a right eye viewing portion, said line blanker comprising:
 a line interpolator that receives said stereoscopic image and alternately substitutes blanks for even or odd lines of said stereoscopic image;
 a line doubler that places each line of said stereoscopic image in a line buffer and fills each of said blanks with a line of said stereoscopic image located immediately above each of said blanks;
 an image fabrication unit that receives said stereoscopic image as adapted by said line interpolator and said line doubler and generates said line-blanked image;
 a line processor that receives said stereoscopic image and said line-blanked image and selects one of said images to transmit to said display device; and
 a control unit that monitors said stereoscopic image for a control signal and instructs said line processor which image to output based on said control signal, said control unit enables or disables said line blanker based on said control signal.

13. The line blanker of claim 12, said control unit further comprising a first line signal detector that detects a first line signal embedded in said stereoscopic image and sets said shutter glasses to selectively open either said left eye viewing portion or said right eye viewing portion based on said first line signal.

14. The line blanker of claim 12, wherein said control signal further comprises a toggle signal that toggles a counter, whereby said counter substantially continuously indicates a counter position relative to a first line of said line-blanked image.

15. The line blanker of claim 12, wherein said control signal comprises a specific pattern of embedded colors.

16. A line blanker that converts a stereoscopic image into a line-blanked stereoscopic image, whereby said line-blanked image can be viewed on a standard non-interleaved display device by a viewer wearing shutter glasses having a left eye viewing portion and a right eye viewing portion, said line blanker comprising:
 a line buffer that receives said stereoscopic image and alternately substitutes blanks for even or odd lines of said stereoscopic image;
 a line doubler that places each line of said stereoscopic image in a single line buffer and fills each of said blanks with a line of said stereoscopic image located immediately above each of said blanks;
 an image fabrication unit that receives said stereoscopic image as adapted by said line buffer and said line doubler and generates said line-blanked image;
 a line processor that receives said stereoscopic image and said line-blanked image and selects one of said images to transmit to said display device; and
 a control unit that monitors said stereoscopic image for a control signal and instructs said line processor which image to output based on said control signal, said control unit enables or disables said line blanker based on said control signal.

17. The line blanker of claim 16, said control unit further comprising a first line signal detector that detects a first line signal embedded in said stereoscopic image and sets said shutter glasses to selectively open either said left eye viewing portion or said right eye viewing portion based on said first line signal.

18. The line blanker of claim 16, wherein said control signal further comprises a toggle signal that toggles a counter, whereby said counter substantially continuously indicates a counter position relative to a first line of said line-blanked image.

19. The line blanker of claim 16, wherein said control signal comprises a specific pattern of embedded colors.

20. A line blanker that converts a stereoscopic image into a line-blanked stereoscopic image, whereby said line-blanked image can be viewed on a flat panel display device by a viewer wearing shutter glasses having a left eye viewing portion and a right eye viewing portion, said line blanker comprising:
 a line interpolator that receives said stereoscopic image and alternately substitutes blanks for even or odd lines of said stereoscopic image;
 an image fabrication unit that receives said stereoscopic image as adapted by said line interpolator and generates said line-blanked image;
 a line processor that receives said stereoscopic image and said line-blanked image and selects one of said images to transmit to said flat panel display device; and
 a control unit that monitors said stereoscopic image for a control signal and instructs said line processor which image to output based on said control signal, said control unit enables or disables said line blanker based on said control signal.

21. A line blanker that converts a stereoscopic image into a line-blanked stereoscopic image, whereby said line-blanked image can be viewed on an LCD projection system by a viewer wearing shutter glasses having a left eye viewing portion and a right eye viewing portion, said line blanker comprising:
 a line buffer that receives said stereoscopic image and alternately substitutes blanks for even or odd lines of said stereoscopic image;
 an image fabrication unit that receives said stereoscopic image as adapted by said line buffer and generates said line-blanked image;
 a line processor that receives said stereoscopic image and said line-blanked image and selects one of said images to transmit to said LCD projection system; and
 a control unit that monitors said stereoscopic image for a control signal and instructs said line processor which image to output based on said control signal, said control unit enables or disables said line blanker based on said control signal.

* * * * *